Nov. 24, 1959  F. G. BACK  2,913,957
VARIFOCAL LENS ASSEMBLY
Filed June 27, 1958  2 Sheets-Sheet 1

INVENTOR.
Frank G. Back
BY
ATTORNEY

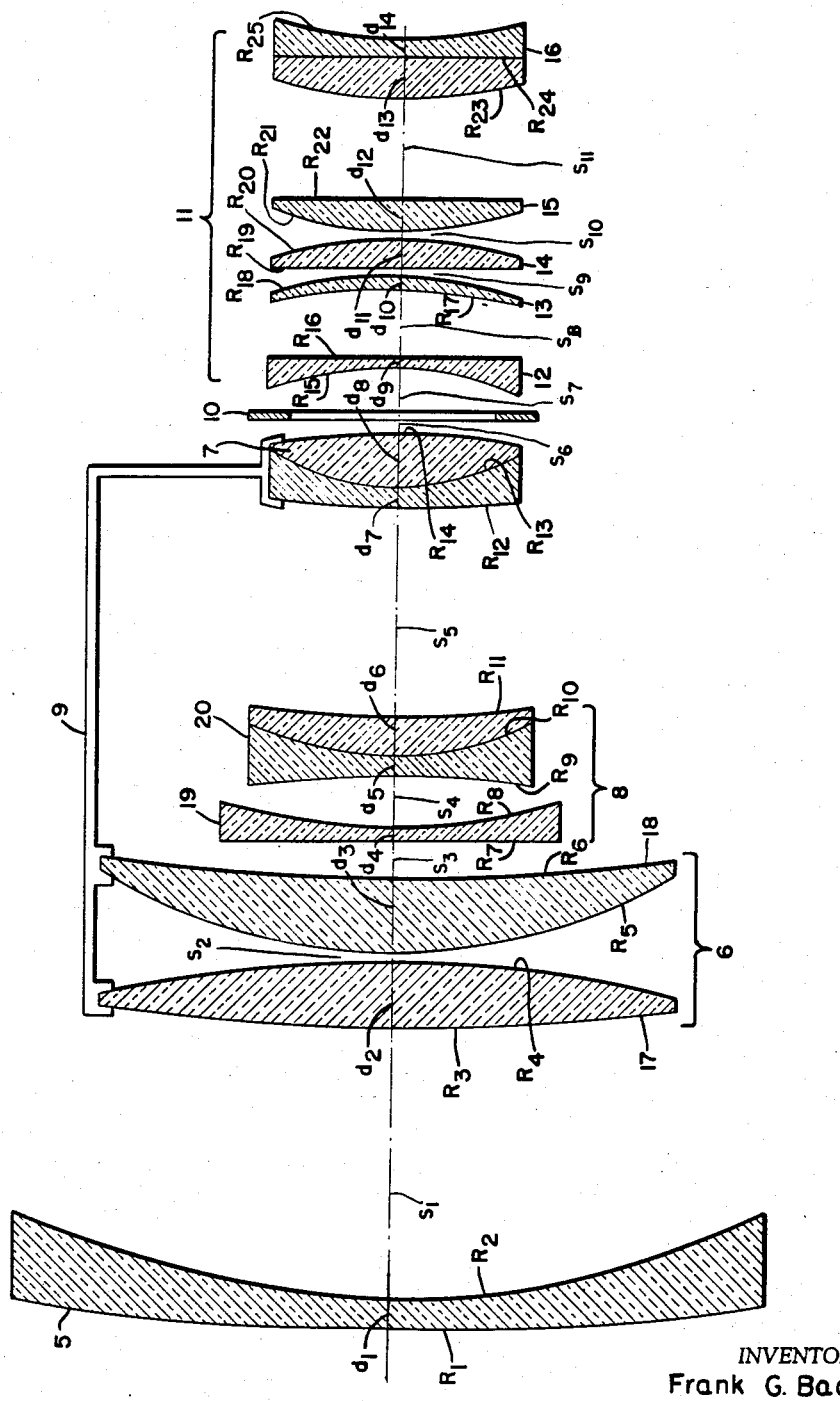

United States Patent Office 2,913,957
Patented Nov. 24, 1959

2,913,957

VARIFOCAL LENS ASSEMBLY

Frank G. Back, Lattingtown, N.Y.

Application June 27, 1958, Serial No. 745,009

6 Claims. (Cl. 88—57)

This invention relates to varifocal lens structures and particularly to a varifocal lens for use in a single lens reflex still camera.

Varifocal lenses employing the principles of image shift compensation are well known in the field of motion picture photography, and television. The use of such lenses for still photography, however, is not possible since a varifocal lens covering the standard required range for still cameras has to have a much wider angle of coverage than lenses for movie and television work. In addition, the image correction over the entire field has to be far greater in still photographic work than in motion picture work. In still photography, the bulk of the lens must be small as compared with the permissible size of motion picture or television camera lenses.

Accordingly, it is an obect of the present invention to provide a varifocal lens for use with still cameras which will avoid the shortcomings of presently known varifocal lenses.

Another object of the present invention is to provide a varifocal lens which is particularly adapted for use in single lens reflex cameras.

A further object of the present invention is to provide a varifocal lens which will have a wider angle of coverage than any such lens heretofore known in the art.

Still another object of the present invention is to provide a varifocal lens system having an image correction over the entire field and light transmission far superior to previously known devices.

An object of the present invention is to provide a varifocal lens for still cameras which will be small enough for use on hand held cameras and the like.

A feature of the present invention is its use of constant aberrational residues over the entire range of the lens section in front of the iris stop.

Another feature of the present invention is its use of a relay to compensate for the constant aberrational residues.

A further feature of the present invention is its use of varifocal lens systems in front of the iris stop wherein all of the surfaces facing variable air spaces are of low power or opposite power to those facing fixed air spaces.

The invention consists of the construction, combination and arrangement of parts, as herein illustrated, described and claimed.

In the accompanying drawings forming a part hereof is illustrated two forms of embodiment of the invention and in which:

Figure 2 is a view similar to Figure 1 showing the movable elements in the rear or wide angle positions.

Figure 1:
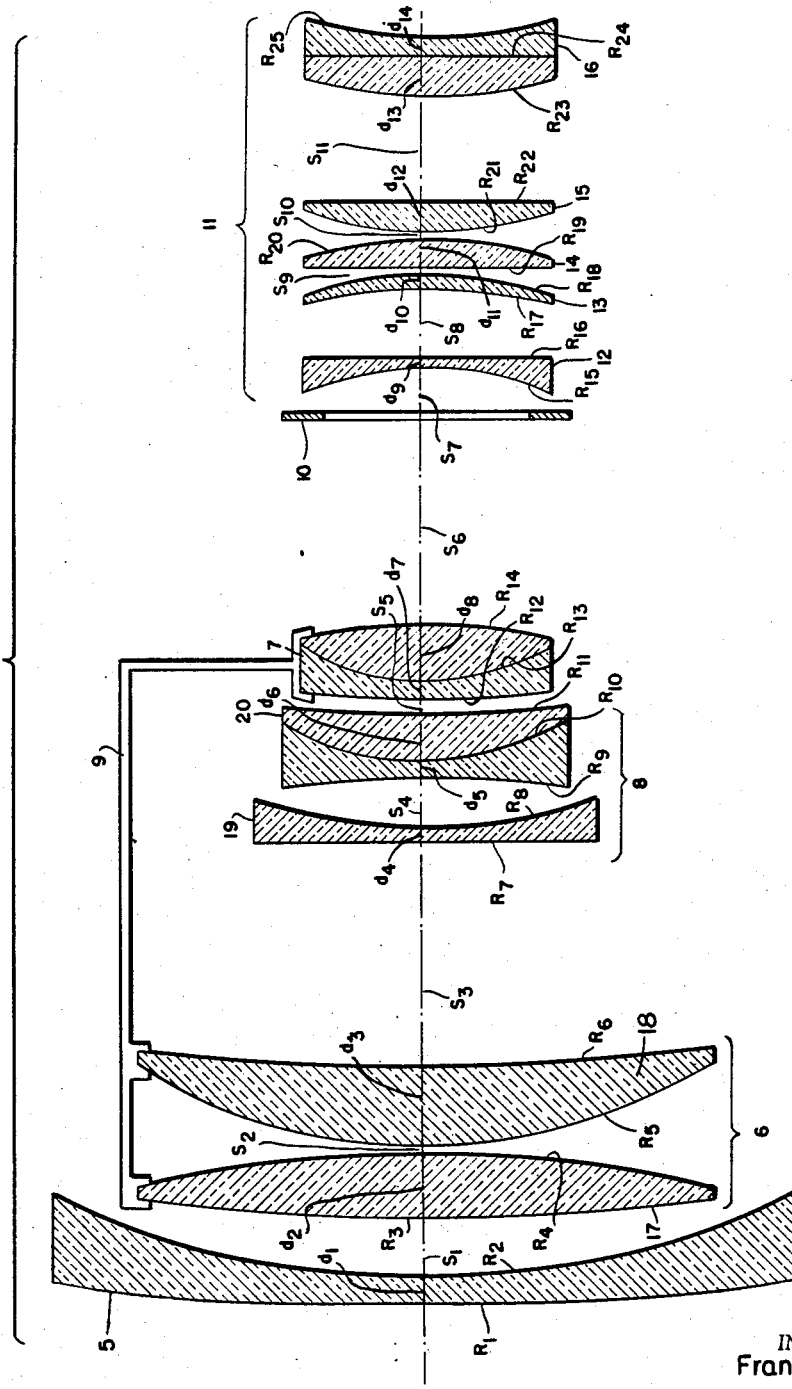
Figure 1 is a view in longitudinal section of a complete optically compensated embodiment of the present invention showing the movable elements in the forward or telephoto position.

Referring to the drawings, 5 indicates the front lens of the varifocal lens system behind which there is carried the axially slidable lens or lens assembly 6, known in the art as the variator. A lens or lens system hereinafter referred to as a compensator 7 is coupled at 9 to the variator for slidable movement with the said variator. Between the slidable lenses 6, 7, there is positioned a fixed lens assembly 8 which serves to reverse the image coming from the variator 6 and is known as the erector.

An iris stop 10 is located behind and as close as possible to the last movable lens element 7 of the varifocal system. A relay, generally indicated at 11 in Figures 1 and 2 is carried behind the iris stop and serves to bring the image into its proper position on the film plane. The relay determines partially the absolute value of the focal length of the whole system.

Relays as formerly known in the literature, have their strong negative components enclosed by positive components. However, for the purpose of the present invention it has been found necessary to provide a relay in which the lens combination consists of positive components enclosed by negative components. This construction has been found to be necessary since a negative meniscus close to and concave towards the aperture stop, corrects for the astigmatism of the front system of the lens. The dispersive power of the negative meniscus makes the convergent rays of the front lens divergent and thereby insures a back focal length sufficient for a reflex camera. In the present embodiment of the invention the negative meniscus is made of a modern high refractive, low dispersive lanthanum crown to prevent over-correction of the Petzval sum. It will be seen that the negative meniscus 12 in Figures 1 and 2, is followed by three positive lenses 13, 14 and 15, which serve to correct the spherical aberration and coma. The last element 16 of the relay is a negative meniscus, concave towards the image space. The main function of the last element 16 is to influence the distortion which cannot be stabilized by the front system in such a way that it shows an equal amount of over-correction in one end position and of under-correction at the other end.

A preferred form of relay for use in conjunction with the present varifocal system is one in which the first negative component 12 is at least one-half and not more than three times the numerical value of the total power of the relay. The positive components 13, 14, 15, should be at least twice and not more than four times the total power of the relay. The rear negative component 16 is preferably at least one-half and not more than one and one-half of the absolute value of the total power of the relay.

The following table gives the optical characteristics of the relay system shown in the drawing and described above:

RELAY

| Lens No. | Radius (R) (mm.) | Thickness(d), Air Spacing (s) | Glass (Cat. Ref.) | Index $N_D$ | Dispersion (V) |
|---|---|---|---|---|---|
| 12 | $R_{15}=-22.40$ $R_{16}=-327.40$ | $d_\kappa=1.50$ $s_8=8.75$ | LaC | $N_{D12}=1.720$ | $V_{12}=50.3$ |
| 13 | $R_{17}=-68.40$ $R_{18}=-28.00$ | $d_{10}=3.70$ $s_9=0.50$ | DBC | $N_{D13}=1.620$ | $V_{13}=60.3$ |
| 14 | $R_{19}=\infty=$ Plano $R_{20}=-63.10$ | $d_{11}=3.00$ $s_{10}=0.50$ | DBC | $N_{D14}=1.620$ | $V_{14}=60.0$ |
| 15 | $R_{21}=+54.10$ $R_{22}=-231.50$ | $d_{12}=3.40$ $s_{11}=13.50$ | DBC | $N_{D15}=1.620$ | $V_{15}=60.0$ |
| 16 | $R_{23}=+38.20$ $R_{24}=-167.80$ $R_{25}=+24.30$ | $d_{13}=5.00$ $d_{14}=1.50$ | DBC EDF | $N_{D16}=1.620$ $N_{D16}=1.721$ | $V_{16}=60.0$ $V_{16}=29.3$ |

Equivalent focal length of whole system (E.F.L.)=80.00–40.00.
Back focal length of whole system (B.F.L.)=41.10.
Radius, thickness and spacing in millimeters.

Referring again to the variator 6, it will be noted that it consists of a plurality of air spaced components 17, 18. As shown in the following table, the sum of the powers of the surfaces facing the fixed air space between the components 17, 18, is at least four times as large as the sum of the powers facing the variable air spaces on the object and image side of said variator. The erector 8 shown in Figures 1 and 2 also consists of a plurality of air spaced components 19, 20, one of which, 20, is a cemented doublet adapted, when used with the compensator doublet 7, to keep the longitudinal and lateral color of the system substantially constant.

The optical characteristics of the front lens, the variator lenses, the erector lenses, and the compensator, are as follows:

| Lens No. | Radius (R) (mm.) | Thickness (d) and Air Spacing (s) | Glass (Cat. Ref.) | Index ($N_D$) | Dispersion (V) |
|---|---|---|---|---|---|
| Front Lens 5 | $R_1=+817.00$ $R_2=+82.00$ | $d_1=2.50$ $s_1=6.00$ to 26.00 | EDF | $N_{D1}=1.689$ | $V_1=30.9$ |
| Variator (No. 1) 17 | $R_3=+372.20$ $R_4=-114.00$ | $d_2=6.00$ $s_2=0.30$ | DBC | $N_{D2}=1.620$ | $V_2=60.0$ |
| Variator (No. 2) 18 | $R_5=+56.70$ $R_6=+372.20$ | $d_3=8.00$ $s_3=22.00$ to 2.00 | DBC | $N_{D3}=1.620$ | $V_3=60.0$ |
| Erector (No. 1) 19 | $R_7=\infty=$ Plano $R_8=+66.60$ | $d_4=2.00$ $s_4=4.25$ | LaC | $N_{D4}=1.720$ | $V_4=50.3$ |
| Erector (No. 2) 20 | $R_9=-93.50$ $R_{10}=+25.00$ $R_{11}=+140.20$ | $d_5=1.80$ $d_6=3.70$ $s_5=1.80$ to 21.80 | LaC EDF | $N_{D5}=1.720$ $N_{D6}=1.721$ | $V_5=50.3$ $V_6=29.3$ |
| Compensator 7 | $R_{12}=+107.60$ $R_{13}=+25.00$ $R_{14}=-58.85$ | $d_7=2.00$ $d_8=5.00$ $s_6=21.00$ to 1.00 Stop $s_7=4.50$ | DBC DF | $N_{D7}=1.620$ $N_{D8}=1.621$ | $V_7=60.0$ $V_8=36.2$ |

$f=35$ mm. to 80 mm. (approx.)
Radius, thickness and spacing in millimeters.

In the above tables the symbols designate the following:

$N_D$—Refractive index for D-line
V—Abbe's dispersion number
EDF—Extra dense flint
DBC—Dense barium crown
LaC—Lanthanum crown
DF—Dense flint It has been found that regular correction methods, as previously known in the art, do not fulfill the conditions necessary for a varifocal lens for still cameras. If step by step every component of the varifocal lens (as previously known in the art) is corrected within itself, a tremendous number of lenses would be required. The transmission would be drastically cut and an unwieldy and bulky lens would result and be unusable because of its low light transmission. When the correction is not made in every component, zoom positions will differ widely as far as aberrational corrections are concerned and the lens would give picture quality only in some selective positions, but not over the entire range.

However, if the aberrational correction is planned in such a way that aberrational residues in front of the iris stops are kept constant over the entire range of the lens, regardless of the numerical value, a relay can be developed which compensates for those aberrational residues. A lens will thus be possible which will give small physical dimensions with good correction and with the necessary big field angles.

In addition, it has been found that an important requirement of the lens groups in the front systems before the stop is that all the glass surfaces facing the variable air spaces have to be of low power and even of opposite power to those facing fixed air spaces. With this arrangement, it is possible to hold aberrational residues substantially constant over the entire zoom range though the aberrational residues still have considerable numerical value. With the aberrational residues constant it is possible to correct all of them by means of the relay lens system hereinabove described.

The above description and drawings have been directed toward optically compensated varifocal lens system. However, mechanically compensated varifocal systems may be constructed using the principles herein set forth without departing from the spirit of the invention.

Having thus fully described the invention, what is claimed as new and desired to be secured by Letters Patent of the United States is:

1. A varifocal lens system for still picture photography comprising, in the order of the direction of the incident light, a front lens of negative power to receive light coming from an object and form a fixed, stationary image thereof, a variator lens group axially slidable with respect to the front lens to change the size of the image formed by the front lens, said variator lens group comprising a first variator lens of positive power, a second variator lens of positive power, and a fixed air space of the order of ⅓% of the maximum focal length of the whole system between the variator lenses, said variator lenses being disposed with their surfaces of larger contributing powers facing the fixed air space therebetween, a fixed erector lens group spaced from the variator lens group to invert the image received from the variator lens group, said erector lens group comprising a first erector lens of negative power, a second erector lens of negative power, and a fixed air space of the order of 5% of the maximum focal length of the whole system between the erector lenses, said erector lenses being disposed with their surfaces of larger contributing powers facing the fixed air space therebetween, a compensator lens of positive power, air spaced from the erector lens group, coupled to the variator lens group and axially slidable therewith to keep the image formed by the front lens, the variator lens group, and the erector lens group stationary in space, an aperture stop spaced from the compensator, a relay lens assembly spaced from the aperture stop to receive the light from the compensator to correct the aberrations and to throw the stationary image formed by the compensator upon the film plane, said relay lens assembly comprising a first negative relay lens component concave toward the aperture stop adapted to effect astigmatic correction and field flattening, a positive relay lens group spaced from the first negative relay adapted to make the final image aplanatic, and a second negative relay lens element, concave toward the image and spaced from the positive relay lenses to distribute the residual distortion evenly between the telephoto and wide angle position.

2. A varifocal lens system according to claim 1, in which one erector lens element, the compensator and the second negative relay lens consists of cemented doublets, all cemented surfaces of which are concave in the direction of the aperture stop and in which the glass forming both parts of the cemented doublets of the erector and compensator have substantially the same index of refraction, said doublets in front of the aperture stop being adapted to stabilize longitudinal and lateral chromatic aberrations and said relay doublet being adapted to compensate for residual color defects.

3. A varifocal lens system for still picture photography comprising in the order of the direction of the incident light, a front lens of negative power to receive light coming from an object and form a fixed, stationary image thereof, a front and rear surface on said front lens, said front surface having a radius of curvature at least eight times the maximum focal length of the whole system and the said rear surface having a radius of curvature at least equal to ⅞ the maximum focal length of the whole system, a variator lens group axially slidable with respect to the front lens to change the size of the image formed by the front lens, said variator lens group comprising, a first variator lens element of positive power, a variable air space between the front lens and first variator lens, a second variator lens of positive power and a fixed air space of the order of ⅓% of the maximum focal length of the whole system between the variator lenses, said variator lenses having an outer front surface $R_3$, an outer rear surface $R_6$, an inner front surface $R_4$ and an inner rear surface $R_5$, said surfaces having a power distribution according to the following relationship: the sum of the absolute value of the curvatures of said inner front and rear surfaces facing the fixed air space between the variator lenses being at least 3 times but not more than 7 times the sum of the absolute value of the curvatures of said outer front surface and said outer rear surface facing variable air spaces to fulfill the condition:

$$3\left|\left(\frac{1}{R_3}+\frac{1}{R_6}\right)\right|<\left|\left(\frac{1}{R_4}+\frac{1}{R_5}\right)\right|<7\left|\left(\frac{1}{R_3}+\frac{1}{R_6}\right)\right|$$

where $R_3$ and $R_6$ are substantially equal to 4½ times the maximum focal length of the whole system; a fixed erector lens group spaced from the variator lens group to invert the image received from the variator lens group, said erector lens group comprising a first stationary erector lens element of negative power, a second erector lens of negative power and a fixed air space of the order of 5% of the maximum focal length of the whole system between the erector lenses, a variable air space between the first erector lens element and the second variator lens, a compensator lens of positive power, said compensator being separated by a variable air space from the erector lens group, coupled to the variator lens group and axially slidable therewith to keep the image formed by the front lens, the variator lens group, and erector stationary in space, said first and second erector lens elements having an outer front surface $R_7$ facing the variable air space $s_3$ between the variator and erector and an outer rear surface $R_{11}$ facing the variable air space $s_5$ between the erector and compensator, an inner front surface $R_8$, and an inner rear surface $R_9$, both facing the fixed air space $s_4$ between the erector elements, said surfaces having a power distribution according to the following relationship: the sum of the absolute values of the curvatures of said inner front and rear surfaces facing the fixed air space being at least 3 times but not more than 10 times the sum of the absolute values of the curvatures of said outer front surface facing the variable air space toward the variator, and the outer rear surface facing the variable air space opposite the compensator to fulfill the condition:

$$3\left|\left(\frac{1}{R_7}+\frac{1}{R_{11}}\right)\right|<\left|\left(\frac{1}{R_8}+\frac{1}{R_9}\right)\right|<10\left|\left(\frac{1}{R_7}+\frac{1}{R_{11}}\right)\right|$$

where the absolute value of $R_8$ is at least ¾ but not more than equal to the maximum focal length of the whole system and the absolute value of $R_9$ is at least equal to but not more than 1¼ times the maximum focal length of the whole system; an aperture stop spaced from the compensator, a relay lens assembly spaced from the aperture stop to receive the light from the compensator to correct the aberrations and throw the stationary image formed by the compensator upon the film plane, said relay lens assembly comprising a first negative relay lens component concave toward the aperture stop adapted to effect astigmatic correction and field flattening, a positive relay lens group spaced from the first negative relay adapted to make the final image aplanatic, and a second negative relay lens element concave toward the image and spaced from the positive relay lenses to distribute the residual distortion evenly between the telephoto and wide angle position.

4. A varifocal lens system according to claim 1 in which the first negative component 12 of the relay 11 has a power of at least ½ and not more than 3½ times the numerical value of the total power of the relay, the plurality of positive components 13, 14, 15, have a total power of at least twice and not more than 4 times the total power of the relay and the negative component 16 next to the image plane has a power of at least ½ and not more than 1½ times the absolute value of the total power of the relay to fulfill the following relationships, BFL is Back Focal Length, EDF designates Extra Dense Flint $R_{15}$ to $R_{25}$, are the respective radii of refracting lens surfaces numbered from the front to the rear of the lens system, $d_9$ to $d_{14}$, are the respective axial thicknesses and $s_8$ to $s_{11}$, are the respective axial separations from the front to the rear of the lens system:

| Lens No. | Radius (R) (mm.) | Thickness (d), Air Spacing (s) | Glass (Cat. Ref.) | Index $N_D$ | Dispersion (V) |
|---|---|---|---|---|---|
| 12 | $R_{15}=-22.40$ | $d_9=1.50$ | LaC | $N_{D12}=1.720$ | $V_{12}=50.3$ |
|    | $R_{16}=-327.40$ | $s_8=8.75$ | | | |
| 13 | $R_{17}=-68.40$ | $d_{10}=3.70$ | DBC | $N_{D13}=1.620$ | $V_{13}=60.3$ |
|    | $R_{18}=-28.00$ | $s_9=0.50$ | | | |
| 14 | $R_{19}=\infty=$Plano | $d_{11}=3.00$ | DBC | $N_{D14}=1.620$ | $V_{14}=60.0$ |
|    | $R_{20}=-63.10$ | $s_{10}=0.50$ | | | |
| 15 | $R_{21}=+54.10$ | $d_{12}=3.40$ | DBC | $N_{D15}=1.620$ | $V_{15}=60.0$ |
|    | $R_{22}=-231.50$ | $s_{11}=13.50$ | | | |
|    | $R_{23}=+38.20$ | $d_{13}=5.00$ | DBC | $N_{D16}=1.620$ | $V_{16}=60.0$ |
| 16 | $R_{24}=-167.80$ | $d_{14}=1.50$ | EDF | $N_{D16}=1.721$ | $V_{16}=29.3$ |
|    | $R_{25}=+24.30$ | | | | |

Equivalent focal length of whole system (E.F.L.)=$f$=80.00 to 40.00.
Back focal length of whole system (B.F.L.)=41.10.
Radius, thickness and spacing in millimeters.

where $\Phi_{11}$=the total power of the relay, $\phi_{12}$=the power of lens 12, $\phi_{13}$=the power of lens 13, $\phi_{14}$=the power of lens 14, $\phi_{15}$=the power of lens 15, $\phi_{16}$=the power of lens 16;

$$\tfrac{1}{2}|\Phi_{11}|<\phi_{12}<3\tfrac{1}{2}|\Phi_{11}|$$
$$2\Phi_{11}<(\phi_{13}+\phi_{14}+\phi_{15})<4\phi_{11}$$
$$\tfrac{1}{2}|\Phi_{11}|<\phi_{16}<\tfrac{1}{2}|\Phi_{11}|$$

5. A varifocal lens system for single lens reflex cameras comprising, a front section of variable focal length including an axially slidable air spaced variator and compensator and a stationary erector therebetween, an aperture stop spaced from the front section and a rear section of fixed focal length including a relay having five elements therein with optical characteristics of the following order wherein $N_D$ is the refractive index for the D line, V is Abbé's dispersion number, LaC stands for Lanthanum Crown, DBC indicates Dense Barium Crown, and EFL is Equivalent Focal Length, 6. A varifocal lens system for single lens reflex cameras comprising, a front section of variable focal length including a front lens, air spaced movable variator lenses behind the front lens, a compensator air spaced from the variator and axially movable within the lens system, fixed erector lenses between the variator and compensator lenses and air spaced therefrom, an aperture stop spaced from the front section, and a rear section to compensate for aberrational residues coming from the front section in which the lenses of the said front section have the following optical characteristics wherein $N_D$ is the refractive index for D line, V is Abbé's dispersion number, EDF is Extra Dense Flint, DBC is Dense Barium Crown, LaC is Lanthanum Crown, DF indicates Dense Flint $R_1$ to $R_{14}$, are the respective radii of the refracting lens surfaces numbered from the front to the rear of the lens system, $d_1$ to $d_8$, are the respective axial thicknesses and $s_1$ to $s_8$ are the respective axial separations from the front to the rear of the lens system:

| Lens No. | Radius (R) (mm.) | Thickness (d), and Air Spacing (s) | Glass (Cat. Ref.) | Index ($N_D$) | Dispersion (V) |
|---|---|---|---|---|---|
| Front Lens 5 | $R_1=+817.00$ | $d_1=2.50$ | EDF | $N_{D1}=1.689$ | $V_1=30.9$ |
|              | $R_2=+82.00$ | $s_1=6.00$ to $26.00$ | | | |
| Variator (No. 1) 17 | $R_3=+372.20$ | $d_2=6.00$ | DBC | $N_{D2}=1.620$ | $V_2=60.0$ |
|                     | $R_4=-114.00$ | $s_2=0.30$ | | | |
| Variator (No. 2) 18 | $R_5=+56.70$ | $d_3=8.00$ | DBC | $N_{D3}=1.620$ | $V_3=60.0$ |
|                     | $R_6=+372.20$ | $s_3=22.00$ to $2.00$ | | | |
| Erector (No. 1) 19  | $R_7=\infty=$Plano | $d_4=2.00$ | LaC | $N_{D4}=1.720$ | $V_4=50.3$ |
|                     | $R_8=+66.60$ | $s_4=4.25$ | | | |
|                     | $R_9=-93.50$ | $d_5=1.80$ | LaC | $N_{D5}=1.720$ | $V_5=50.3$ |
| Erector (No. 2) 20  | $R_{10}=+25.00$ | $d_6=3.70$ | EDF | $N_{D6}=1.721$ | $V_6=29.3$ |
|                     | $R_{11}=+140.20$ | $s_5=1.80$ to $21.80$ | | | |
| Compensator 7       | $R_{12}=+107.60$ | $d_7=2.00$ | DBC | $N_{D7}=1.620$ | $V_7=60.0$ |
|                     | $R_{13}=+25.00$ | $d_8=5.00$ | DF | $N_{D8}=1.621$ | $V_8=36.2$ |
|                     | $R_{14}=-58.85$ | $s_6=21.00$ to $1.00$ Stop | | | |
|                     |                 | $s_7=4.50$ | | | |

Equivalent focal length=$f$=35 mm. to 80 mm. (approx.).
Radius, thickness and spacing in millimeters.

(References on following page)

References Cited in the file of this patent

UNITED STATES PATENTS

| | | |
|---|---|---|
| 1,584,272 | Bertele | May 11, 1926 |
| 2,566,485 | Cuvillier | Sept. 4, 1951 |
| 2,704,487 | Rosier | Mar. 22, 1955 |
| 2,718,817 | Back et al. | Sept. 27, 1955 |
| 2,719,457 | Tripp | Oct. 4, 1955 |
| 2,741,947 | Back | Apr. 17, 1956 |
| 2,778,272 | Reymond | Jan. 22, 1957 |
| 2,782,684 | Hopkins | Feb. 26, 1957 |